No. 693,758. Patented Feb. 18, 1902.
H. N. THAYER.
UMBRELLA SUPPORT.
(Application filed Oct. 26, 1901.)
(No Model.)
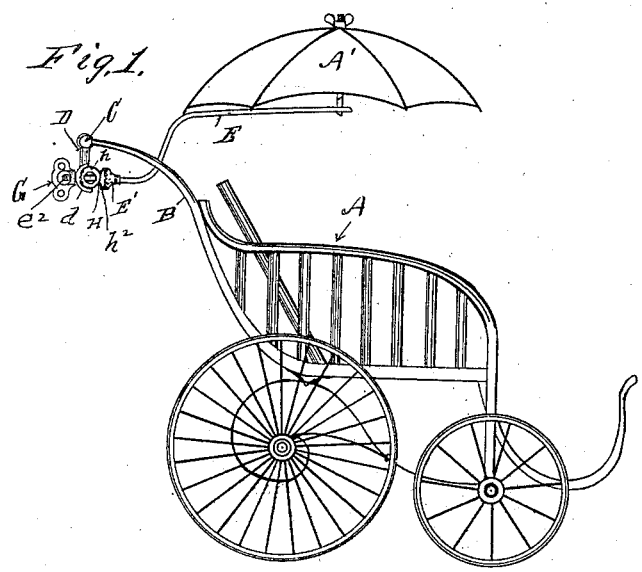
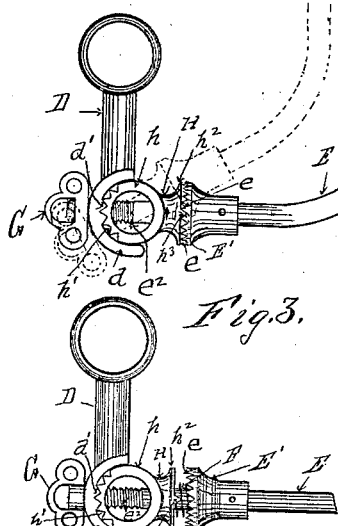
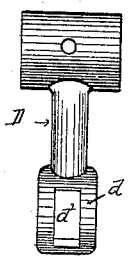
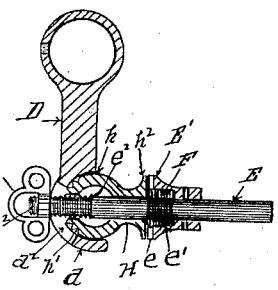
Witnesses.
Inventor.
Horace N. Thayer
By ... Atty.

UNITED STATES PATENT OFFICE.

HORACE N. THAYER, OF ERIE, PENNSYLVANIA.

UMBRELLA-SUPPORT.

SPECIFICATION forming part of Letters Patent No. 693,758, dated February 18, 1902.

Application filed October 26, 1901. Serial No. 80,043. (No model.)

*To all whom it may concern:*

Be it known that I, HORACE N. THAYER, a citizen of the United States, residing at Erie, in the county of Erie and State of Pennsylvania, have invented certain new and useful Improvements in Shade-Holders for Baby-Carriages; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to shade-holders for baby-carriages, and particularly to mechanism for adjusting the same; and it consists substantially of the combination of a serrated joint for vertical adjustment and a serrated joint for rotary adjustment and a thumb-nut for simultaneously tightening both of said joints, so as to firmly retain the shade in any position to which it may be adjusted. These and other features of my invention are hereinafter fully set forth and explained, and illustrated in the accompanying drawings, in which—

Figure 1 is a side view in elevation of a baby-carriage embodying my invention. Fig. 2 is an enlarged view in elevation of the mechanism constituting my invention. Fig. 3 is a like view of the same with the thumb-nut unscrewed, so as to admit of the rotary and vertical adjustment of the shade-holder. Fig. 4 is a vertical section of the same. Fig. 5 is a rear view in elevation of one of the parts of my device.

In the drawings illustrating my invention, A is a baby-carriage, A' the shade, B the handles, and C the handle-bar therein, all of which are of ordinary construction.

Upon the handle-bar C, I secure an arm D, which preferably projects downwardly therefrom and has on its lower end a transverse semicircular projection $d$, having teeth $d'$ on its inner surface and also having a vertical slot $d^2$ therein, through which the end of a shade-supporting arm E projects, which arm E is preferably made of a round rod bent to such shape as may be desired—for example, as shown in Figs. 1 and 2.

On the shade-holder E, near the rear end thereof, I secure a collar E', provided on its rear face with serrations $e$ and with a chamber $e'$ therein, in which there is a spiral spring F. The rear end of the shade-supporting arm E is also provided with a screw-thread $e^2$, upon which a thumb-nut G operates.

Upon the rear end of the shade-supporting arm E, at the rear of the collar E' thereon, I place a loose sleeve H, the rear end of which is a transverse cylinder $h$, adapted to fit the concave surface of the semicircular projection $d$ of the arm D, the rear face thereof being provided with serrations $h'$, adapted to be engaged by the teeth $d'$ on the concave surface of said projection $d$, and the front end of the sleeve H is provided with a collar $h^2$, which is provided with teeth $h^3$, adapted to engage the serrations $e$ in the rear face of the fixed collar E', the spring F between the collar E' and the collar $h^2$ on the sleeve H serving to force them apart when the thumb-nut G is unscrewed, yet retain the cylinder $h$ in contact with the part $d$, as clearly shown in Fig. 3.

In operation when the thumb-nut G is loosened the spring F separates the collars $h^2$ and E', so that the shade-supporting arm E can be rotated in the sleeve H, so as to tip the shade A' sidewise as may be desired, and at the same time the cylinder $h$ can be rotated in its semicircular seat $d$, so as to raise or lower the shade A' as desired, when the thumb-nut G can again be tightened up, so as to secure the parts referred to in place and firmly retain the shade A' in any position to which it may be adjusted.

Having thus described my invention, so as to enable others to construct and use the same, what I claim as new, and desire to secure by Letters Patent of the United States, is—

1. The combination in a shade-holder for baby-carriages, of a fixed arm secured to the carriage, a shade-supporting arm, a fixed collar and a loose sleeve on the rear end of said shade-supporting arm, teeth on said collar and sleeve adapted to engage each other, a cylindrical toothed end on the rear end of said sleeve engaging a semicircular recess in the fixed arm secured to the carriage, and a thumb-nut on the shade-supporting arm, for securing the parts in place, substantially as set forth.

2. The combination in a shade-supporting arm for a baby-carriage, of an arm adapted to be secured to the handle-bar of such carriage, a movable arm to which a shade is attached, a transverse cylindrical serrated joint between the fixed arm and a loose sleeve on the shade-supporting arm, a fixed collar on the shade-supporting arm, serrations thereon adapted to engage serrations on the end of the loose sleeve, a spiral spring between said collar and sleeve, and a thumb-nut on the shade-supporting arm adapted to clamp said joints together substantially as and for the purpose set forth.

In testimony whereof I affix my signature in presence of two witnesses.

HORACE N. THAYER.

Witnesses:
H. M. STURGEON,
F. J. BASSETT.